US006792187B2

(12) United States Patent
Andrus et al.

(10) Patent No.: US 6,792,187 B2
(45) Date of Patent: Sep. 14, 2004

(54) CA-AL-SI OXIDE GLASSES AND OPTICAL COMPONENTS CONTAINING THE SAME

(75) Inventors: Ronald L. Andrus, Painted Post, NY (US); Stephan L. Logunov, Corning, NY (US); Sabyasachi Sen, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 10/321,004

(22) Filed: Dec. 17, 2002

(65) Prior Publication Data

US 2004/0114894 A1 Jun. 17, 2004

(51) Int. Cl.$^7$ ................................................ G02B 6/02
(52) U.S. Cl. ........................ 385/123; 385/142; 501/37
(58) Field of Search ...................... 385/123, 141–145; 501/35, 37

(56) References Cited

U.S. PATENT DOCUMENTS

| | | | |
|---|---|---|---|
| 3,852,079 A | 12/1974 | Davis ........................ | 106/50 |
| 3,942,992 A | 3/1976 | Flannery .................... | 106/52 |
| 4,605,443 A | 8/1986 | MacDowell ................ | 106/104 |
| 4,709,987 A | 12/1987 | Blackburn et al. ........ | 350/96.34 |
| 5,372,640 A | 12/1994 | Schwarz et al. ........... | 106/705 |
| 5,407,872 A * | 4/1995 | Komori et al. ............. | 501/35 |

FOREIGN PATENT DOCUMENTS

| | | | |
|---|---|---|---|
| EP | 0 977 714 | 1/2002 | ............. C03C/3/06 |
| WO | WO 98/47829 | 10/1998 | ............. C03C/3/06 |
| WO | WO 01/56944 | 8/2001 | ........... C03C/13/00 |
| WO | WO 02/063356 | 8/2002 | ............. G02B/6/16 |

OTHER PUBLICATIONS

D.A. Pinnow et al, "Investigation of the Soda Aluminosilicate Glass System For Application To Fiber Optical Waveguides", *Mat. Res. Bull.*, vol. 10 (1975). pp. 133–146.

K. Shiraki et al. "Optical properties of sodium alminosilicate glass", *Journal of Non–Crystalline Solids*, 149 (1992). pp. 243–248.

P.I. Higby et al, "Gallogermanate Glasses as Nar IR Optical Waveguides". *Mat. Res. Soc. Symp. Proc.*, vol. 244 (1992). pp. 115–120.

S. Todoroki et al, "Alkali Magnesium/Zinc Silicate Glasses with Low Rayleigh Scattering", *J. Am. Ceram. Soc.* 78(9)(1995), pp. 2566–2568.

A. Berezin. "Total internal reflection on isotopic interface: a case for isotopic fiber optics". Josa Communications, J. Opt. Soc. Am. B, vol. 5, No. 3. Mar. 1988. pp. 728–729.

* cited by examiner

*Primary Examiner*—Phan T. H. Palmer
(74) *Attorney, Agent, or Firm*—Robert L. Carlson

(57) ABSTRACT

Glasses in the Ca—Al—Si system are useful in forming optical components for use in telecommunication systems. The glasses include, in mole percent: $SiO_2$ present in an amount of about 6 to about 60 percent, $Ga_2O_3$, $Al_2O_3$, or a combination thereof present in an amount of about 12 to about 31 percent, and CaO present in an amount of about 20 to about 65 percent.

20 Claims, 3 Drawing Sheets

CA-AL-SI OXIDE GLASSES AND OPTICAL COMPONENTS CONTAINING THE SAME

FIELD OF THE INVENTION

The present invention relates to Ca—Al—Si oxide glasses and their use in optical components, such as optical fibers and planar waveguides.

BACKGROUND OF THE INVENTION

Optical fiber for long distance communications has reached a remarkable state of perfection. For instance, single mode fibers having loss of about 0.20 dB/km are routinely being produced. Nevertheless, there is still great interest in further reducing the signal loss, since even a reduction as small as 0.01 dB/km can translate into a significant increase in the permitted distance between repeaters. This in turn can translate into a significant difference in system cost, especially for transmission systems such as transoceanic fiber optic systems that by necessity have to employ highly complex and thus costly repeaters.

Factors affecting the light transmission loss of optical fibers include: intrinsic losses resulting from materials constituting the optical fibers, such as Rayleigh scattering, ultraviolet and infrared absorption loss; scattering losses due to fiber structure imperfection and glass flaws, such as scattering by irregularities of the interface of a core and a cladding, strias and bubbles; and absorption loss by impurities that remain in fibers, such as absorption by iron and other transition metals, or absorption by vibration of a hydroxyl group. Imperfection losses and absorption losses can be alleviated in many respects by controlling process parameters.

Intrinsic losses resulting from the materials can only be overcome by the development of new glasses that achieve the desired characteristics for fiber materials. The intrinsic loss in the wavelength region that can be used for transmission of light (i.e., between ultraviolet and infrared absorption edges of a glass) is controlled mainly by Rayleigh scattering from frozen-in density and composition fluctuations in the glass. The length scale of such fluctuations is smaller than the wavelength of light. Since these types of scattering loss are intrinsic to a glass composition, it constitutes the absolute theoretical lower limit of transmission loss that can be obtained from a dry high-purity optical fiber.

Optical fibers from a silica glass composition have become preeminent in the communication field because of advantages such as cost and relative facile processing. However, optical fibers from a silica composition have certain shortcomings which impose limitations on the use thereof. For instance, silica-based optical fibers can transmit light over the limited wavelength range of about 200–2000 nm and have the lowest optical loss of about 0.2 dB/km at a wavelength of 1550 nm.

Low intrinsic scattering losses, as low as fifty percent of that of pure silicon dioxide, have been reported for a number of multi-component oxide glasses in Na—Al-silicate, Na—Mg-silicate, Na—Ca-silicate, Ba—Ga-germanate. However, many of these multi-component glasses suffer from the lack of stability against crystallization. Moreover, the presence of alkali in these compositions makes it impossible to dry and purify these materials at high temperatures with chlorine gas due to the formation of alkali chlorides crystals.

SUMMARY OF THE INVENTION

One aspect of the present invention relates to an optical component for a telecommunication system containing a glass light conducting material that includes, in mole percent: $SiO_2$ present in an amount of about 6 to about 60 percent, $Ga_2O_3$, $Al_2O_3$, or a combination thereof present in an amount of about 12 to about 31 percent, and CaO present in an amount of about 20 to about 65 percent.

Another aspect of the present invention relates to a glass having a composition that includes, in mole percent:

(a) $SiO_2$ present in an amount of about 6 to 13.5 percent or 29 to about 60 percent, $Ga_2O_3$, $Al_2O_3$, or a combination thereof present in an amount of about 12 to about 31 percent, and CaO present in an amount of about 20 to about 65 percent; or (b) $SiO_2$ present in an amount of about 6 to about 60 percent, $Ga_2O_3$, $Al_2O_3$, or a combination thereof present in an amount of about 12 to 13.5 percent or 27.5 to about 31 percent, and CaO present in an amount of about 20 to about 65 percent; or (c) $SiO_2$ present in an amount of about 6 to about 60 percent, $Ga_2O_3$, $Al_2O_3$, or a combination thereof present in an amount of about 12 to about 31 percent, and CaO present in an amount of about 20 up to 49.5 percent.

Yet another aspect of the present invention relates to a method of transmitting an optic signal that includes: passing an optic signal into one end of an optical component of the present invention under conditions effective to transmit the signal to an opposite end of the optical component, wherein the signal loss from the one end to the opposite end is less than about 0.20 dB/km.

Further aspects of the present invention relate to methods of making glasses of the present invention, methods of making the optical components of the present invention, optical components in the form of optical fibers and planar waveguides, and optical fiber bundles or optical fiber ribbons that includes optical fibers of the present invention.

DETAILED DESCRIPTION OF THE INVENTION

Figure 1:
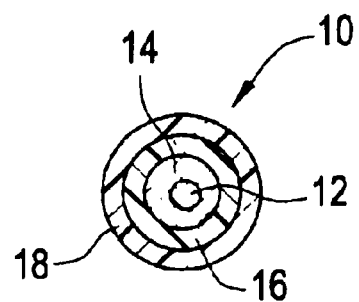
FIG. 1 is a cross-sectional view of an optical fiber of the present invention.

The present invention relates generally to glasses in the Ca—Al—Si system and uses thereof in optical components (e.g., optical fibers, planar waveguides, etc.) of telecommunication systems.

The glasses of the Ca—Al—Si system which are useful in the applications disclosed herein include, in mole percent, $SiO_2$ present in an amount of about 6 to about 60 percent, $Ga_2O_3$, $Al_2O_3$, or a combination thereof present in an amount of about 12 to about 31 percent, and CaO present in an amount of about 20 to about 65 percent. Unless otherwise stated, all components of the inventive glasses are present in mole percent.

Within the class of glasses defined above, a number of suitable component ranges have been defined as follows:

(i) $SiO_2$ present in an amount of about 6 to 13.5 percent, $Ga_2O_3$, $Al_2O_3$, or a combination thereof present in an amount of about 12 to about 31 percent, and CaO present in an amount of about 20 to about 65 percent;

(ii) $SiO_2$ present in an amount of 29 to about 60 percent, $Ga_2O_3$, $Al_2O_3$, or a combination thereof present in an amount of about 12 to about 31 percent, and CaO present in an amount of about 20 to about 65 percent;

(iii) $SiO_2$ present in an amount of about 6 to about 60 percent, $Ga_2O_3$, $Al_2O_3$, or a combination thereof present in an amount of about 12 to 13.5 percent, CaO present in an amount of about 20 to about 65 percent;

(iv) $SiO_2$ present in an amount of about 6 to about 60 percent, $Ga_2O_3$, $Al_2O_3$, or a combination thereof present in an amount of 27.5 to about 31 percent, and CaO present in an amount of about 20 to about 65 percent; or (v) $SiO_2$ present in an amount of about 6 to about 60 percent, $Ga_2O_3$, $Al_2O_3$, or a combination thereof present in an amount of about 12 to about 31 percent, and CaO present in an amount of about 20 up to 49.5 percent.

Substitutions of various glass components can be used to modify glass forming temperatures, viscosity curves, expansivity, and refractive index, as is known to those of skill in the art. For example, and without limitation thereto, germanium and lead can be substituted for silicon, and gallium can be substituted for aluminum (as noted above).

Glasses within the Ca—Al—Si system defined above are characterized by low Rayleigh scattering losses relative to pure silica and Ge-doped silica glasses, both of which are commonly used in fabricating long-haul transmission fibers. Preferred glasses of the present invention are characterized by a Rayleigh ratio of less than about 1.4, more preferably less than about 1.2. Typically, the inventive glasses of the present invention have a Rayleigh ratio of about 0.50 to about 1.4.

Moreover, these glasses provide the opportunity for ultra-low loss fiberization with transmission losses (attenuation) of as low as 0.09 dB/km at 1550 nm in the bulk. As noted above, silica or Ge-doped silica glasses currently used in long-haul fiber transmissions exhibit attenuation of about 0.20 dB/km at 1550 nm. Therefore, glasses of the present invention which exhibit less than about 0.20 dB/km (i.e., between about 0.09 and 0.20 dB/km) at 1550 nm are preferred.

Finally, the glasses of the present invention are chemically durable, stable against crystallization, and are capable of being processed under standard conditions. Certain preferred glasses of the present invention are characterized by a transition temperature of between about 800° C. and about 850° C.

The glass of the present invention can generally be produced according to standard techniques for making glasses: providing glass-forming components (with the desired composition) and treating these components under conditions effective to produce the glass, which generally entails melting the glass-forming components to produce a glass melt and forming the glass melt into a shaped article which is then cooled. Preferably the components are melted in air at a temperature of about 1000 to about 2000° C. for about 2 hours up to about 20 hours to produce the glass melt. Next, the glass melt is formed into a shaped article by forming procedures such as, for example, rolling, pressing, casting, or fiber drawing. A shaped article such as, for example, a patty, rod, sheet, or fiber is cooled and annealed. Annealing can take place at a reduced temperature, e.g., about 300 up to about 700° C. for a sufficient amount of time. The process of forming the shaped article and annealing may also include quenching in air or otherwise roller quenching or splat quenching the glass. Typically, the time required will vary according to the size of the component which is being annealed; thus a thinner glass component such as a glass fiber may take less time to anneal than a glass rod or patty. After annealing, the shaped glass article is allowed to cool to room temperature or is further treated to form an optical component of the present invention.

Because of their characteristics, noted above, the glasses of the present invention are particularly useful for forming optical components used in telecommunication systems. These optical components include optical fibers and planar waveguides, as well as components that contain optical fibers (e.g., fiber bundles and fiber ribbons) or planar waveguides.

Optical fibers of the present invention can take the form of any conventional design or configuration, as well as any design or configuration hereafter developed, so long as the core material used to form the fiber is formed of a glass of the present invention. Typically, an optical fiber includes a glass fiber, composed of a core and one or more cladding layers, and one or more coatings that encapsulate the glass fiber to protect the same.

An optical fiber according to one embodiment of the present invention is illustrated in FIG. 1. The optical fiber 10 includes a glass fiber containing a core 12 and cladding 14, with the core being formed of a glass of the present invention. The cladding is preferably a silica cladding or a calcium-alumina-silicate cladding where the silica content is higher than the core glass. Encapsulating the glass fiber is a primary coating 16 and a secondary coating 18.

Another aspect of the present invention relates to a method of making an optical fiber of the present invention. Basically, this method can be performed by standard methods with the use of a glass of the present invention.

The fiber, with its core and cladding layer, is typically produced in a single operation by methods which are well known in the art using known equipment, such as a draw tower. At a minimum, the core layer is formed of a glass composition of the present invention.

Suitable methods for forming the fiber include: double crucible procedures as described, for example, in Midwinter, *Optical Fibers for Transmission*, New York, John Wiley, pp. 166–178 (1979), which is hereby incorporated by reference in its entirety; rod-in-tube procedures; and doped deposited silica processes, also commonly referred to as chemical vapor deposition ("CVD") or vapor phase oxidation.

In the double-crucible method, a single fiber is drawn from a pair of crucibles containing, respectively, the core glass material and the clad layer glass material. The crucibles are provided such that apertures or orifices therein are concentrically aligned above one another. For example, as the melt of the core glass material flows from the orifice of one crucible, it contacts and is surrounded by the melt of the clad glass material such that the combined melts flow from the orifice of the second crucible. The glass fiber is then drawn from the combined melts flowing from the orifice of the second crucible. The double-crucible method is desirable because it avoids the need to prepare preforms.

A variety of CVD processes are known and are suitable for producing the core and cladding layer used in the optical fibers of the present invention. They include external CVD processes (Blakenship et al., "The Outside Vapor Deposition Method of Fabricating Optical Waveguide Fibers," *IEEE J. Quantum Electron.*, 18:1418–1423 (1982), which is hereby incorporated by reference in its entirety), axial vapor deposition processes (Inada, "Recent Progress in Fiber Fabrication Techniques by Vapor-phase Axial Deposition," *IEEE J. Quantum Electron*. 18:1424–1431 (1982), which is hereby incorporated by reference in its entirety), and modified CVD or inside vapor deposition (Nagel et al., "An Overview of the Modified Chemical Vapor Deposition (MCVD) Process and Performance," *IEEE J. Quantum Electron*. 18:459–476 (1982), which is hereby incorporated by reference in its entirety). Where cylindrical preforms are utilized, the cylindrical preform is heated locally and symmetrically to a suitable temperature, e.g., of about 1500 to about 2000° C. As the preform is heated, such as by feeding the preform into and through a furnace, a glass fiber is drawn from the molten material.

Regardless of the approach for preparing the glass fiber, it is subsequently coated with suitable primary and/or secondary coatings to form the optical fiber of the present invention. A number of suitable primary and secondary coating compositions are commercially available from various vendors, such as DSM Desotech (Elgin, Ill.).

The primary and optional secondary coating compositions are applied to the glass fiber after it has been drawn, preferably immediately after cooling. The coating compositions are then cured to produce the coated optical fiber of the present invention. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and polymerization initiator being employed.

It is frequently advantageous to apply both the primary coating composition and any secondary coating compositions in sequence following the draw process. This is known as a wet-on-wet process. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety. Alternatively, the primary coating composition can be applied and cured to form the primary coating material, then the secondary coating composition(s) can be applied and cured to form the secondary coating material. This is known as a wet-on-dry process.

Figure 2:
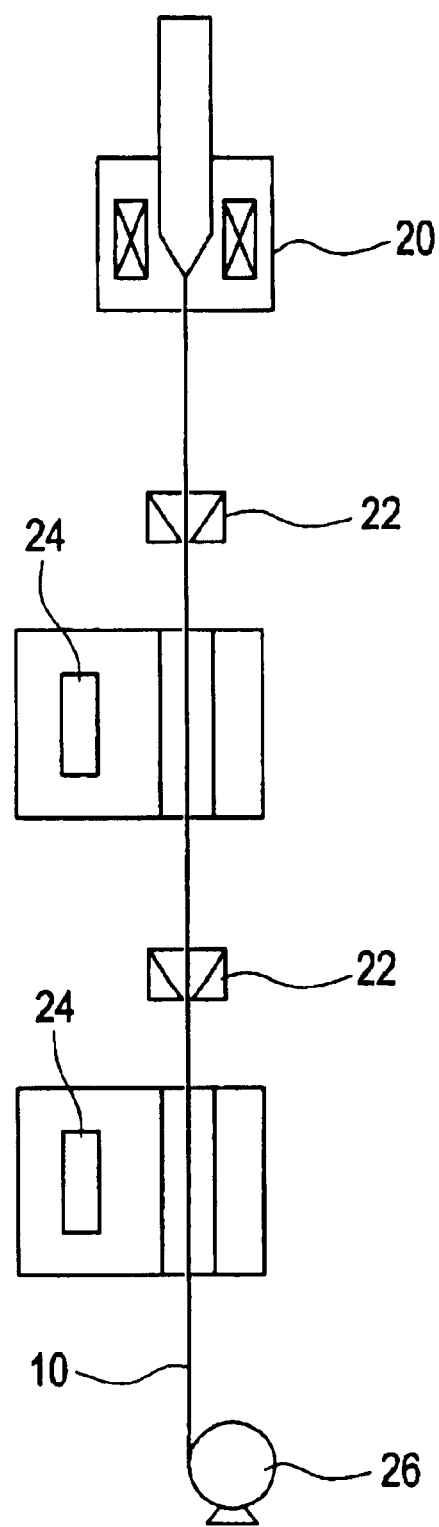
FIG. 2 is a schematic of the process for preparing an optical fiber of the present invention.

The coating process is typically carried out by passing the glass fiber (or previously coated fiber) through a container which includes the particular coating composition to be applied. Thereafter, the thickness of the coating composition is adjusted (i.e., to about 25 to 35 nm) by passing the coated fiber through a die prior to curing as described above. Conventional processes can be utilized to effect the coating process using, e.g., a draw tower. As illustrated in FIG. 2, the manufacturing process involves drawing the fiber from a source of molten glass 20, coating the fiber with a polymerizable coating by a coating device 22 which includes, for example, a die and a point, curing the coating within a curing device 24 to thereby provide a single coating layer or a plurality of coating layers, and then the optical fiber is taken up by a take-up device 26 which winds the fiber onto a spool.

Once the optical fiber has been prepared, it is capable of being integrated into still further optical components, such as fiber cables, fiber bundles, and fiber optic ribbons.

A fiber bundle includes an outer sheath or matrix and a plurality of optical fibers dispersed within the sheath or matrix. According to one configuration, fibers are arranged into a plurality of rows of substantially parallel, substantially aligned optical fibers that are encapsulated in a protective matrix. Other configurations of fiber bundles can also be fabricated using the optical fibers of the present invention.

The optical fibers or the fiber bundles also can be incorporated into a cable using known techniques. Loose tube cables include a plurality of optical fibers of the present invention encapsulated by an outer sheath and a lubricant contained within the sheath between each of the optical fibers.

Figure 3:
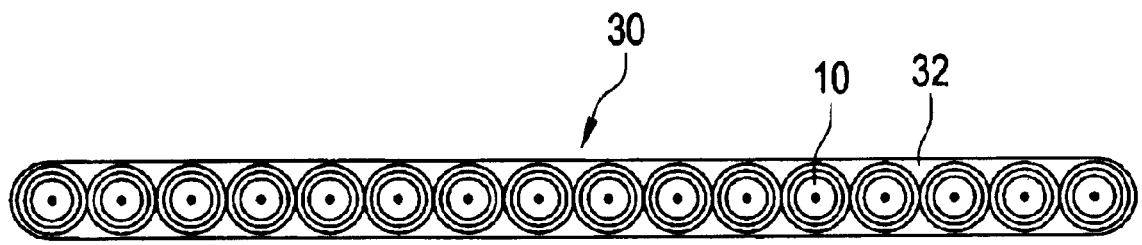
FIG. 3 is a cross-sectional view of a fiber optic ribbon of the present invention.

A fiber optic ribbon includes a plurality of substantially planar, substantially aligned optical fibers and a matrix encapsulating the plurality of optical fibers. The matrix is the cured product of a composition similar in nature to secondary or outer coating materials that are used to prepare the optical fibers of the present invention. One embodiment of a fiber optic ribbon is illustrated in FIG. 3. As shown, fiber optic ribbon 30 of the present invention includes a plurality of single or multi-layered optical fibers 10 substantially aligned relative to one another in a substantially planar relationship and encapsulated by matrix 32. By substantially planar, it is intended that optical fibers 10 are not displaced from a common plane by a distance of more than about one-half the diameter thereof. By substantially aligned, it is intended that the optical fibers 10 are generally parallel with other optical fibers along the length of the fiber optic ribbon 30. In FIG. 3, the fiber optic ribbon 30 contains sixteen (16) optical fibers 10; however, it should be apparent to those skilled in the art that any number of optical fibers 10 (e.g., two or more) may be employed to form fiber optic ribbon 30 disposed for a particular use.

The fiber optic ribbons of the present invention may be encapsulated by the matrix 32 in any known configuration, e.g., edge-bonded ribbon, thin-encapsulated ribbon, thick-encapsulated ribbon, or multi-layer ribbon using standard methods. For example, upon alignment of a plurality of substantially planar optical fibers, a suitable secondary coating composition can be applied and cured according to the methods of preparing optical fiber ribbons as described in U.S. Pat. No. 4,752,112 to Mayr and U.S. Pat. No. 5,486,378 to Oestreich et al., which are hereby incorporated by reference in its entirety.

Figure 4:
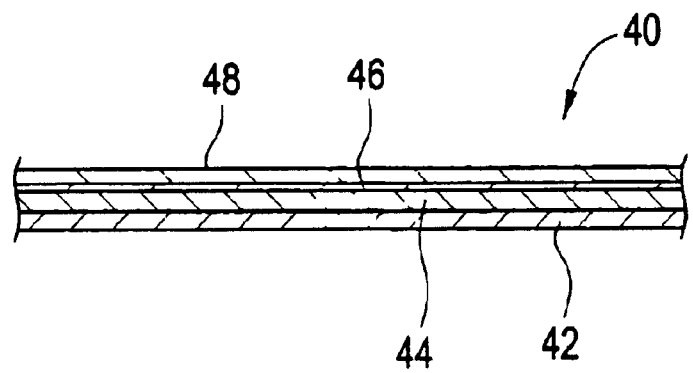
FIG. 4 is a cross-sectional view of a planar waveguide of the present invention.

Planar waveguides of the present invention can take the form of any conventional design or configuration, as well as any design or configuration hereafter developed, so long as the core material used to form the waveguide is formed of a glass of the present invention. According to one embodiment, illustrated in FIG. 4, a planar waveguide 40 of the present invention includes a substrate 42, a clad layer disposed over the substrate 44, a glass waveguide layer disposed over the clad layer 46, and an overclad layer 48 disposed over the glass waveguide layer.

Another aspect of the present invention relates to a method of making a planar waveguide of the present invention. Basically, this method can be performed by standard methods with the use of a glass article of the present invention.

Planar waveguides can be formed by depositing the glass light conducting material onto a substrate comprising a cladding layer, with the glass light conducting material positioned adjacent the cladding layer and then covering the glass light conducting material with an overcladding layer, thereby forming the planar waveguide. In general, planar waveguides can be formed by modifying the above-described soot deposition techniques to include conventional lithographic techniques for the introduction of optical circuitry to the planar waveguide. Alternatively, planar waveguides may be prepared according to the method set forth in U.S. Pat. No. 5,125,946 to Bhagavatula, which is hereby incorporated by reference in its entirety.

Having formed a light conducting optical component of the present invention, such as an optical fiber or a planar waveguide (as well as devices containing the same), the optical fiber and planar waveguide can be incorporated into a telecommunication system using standard techniques for connecting those devices into the system. Thereafter, signals can be transmitted through the optical components of the present invention.

Thus, a further aspect of the present invention relates to a method of transmitting an optic signal (i.e., through a telecommunication system). This is carried out by passing an optic signal into one end of an optical component of the present invention under conditions effective to transmit the signal to an opposite end of the optical component. Because of the low attenuation afforded by the glass of the present invention, signal transmissions using the optical components of the present invention can be characterized by signal losses, from one end of the optical component to its opposite end, of less than about 0.20 dB/km.

EXAMPLES

The following examples are provided to illustrate embodiments of the present invention, but they are by no means intended to limit its scope.

Example 1
Formation of Ca—Al—Si Glasses and Rayleigh Scattering Measurement

The various Ca—Al—Si glasses were prepared in 500 gm batches by melting in platinum crucibles from $CaCO_3$ (C65), $Al_2O_3$ (A302) and nutec sand (S162) batch materials at temperatures ranging between 1600 and 1650° C. for 4 hours. Each melt was dri-gauged and re-melted in order to eliminate compositional heterogeneities.

TABLE 1

Composition of Glass Compositions in Ca—Al—Si System

| Glass Composition | Content (in mole percent) | | | Rayleigh Ratio ($R_{90}$) | Theoretical Loss (dB/km) |
| --- | --- | --- | --- | --- | --- |
| | CaO | $Al_2O_3$ | $SiO_2$ | | |
| A | 29 | 12 | 59 | 1.22 | 0.183 |
| B | 20 | 30 | 50 | 1.11 | 0.166 |
| C | 30 | 30 | 40 | 1.10 | 0.165 |
| D | 40 | 30 | 30 | 0.76 | 0.114 |
| E | 62 | 30.6 | 7.45 | 0.60 | 0.090 |
| F | 56.7 | 28.3 | 15 | 0.89 | 0.133 |
| G | 50 | 20 | 30 | 1.29 | 0.193 |
| H | 50 | 30 | 20 | 1.28 | 0.192 |

Theoretical Attenuation loss is calculated at 1550 nm.

All glass samples were cut into 10×10×20 mm blocks and were polished on all sides for the scattering measurements. Scattering measurements were performed with a pulsed laser source. (The Rayleigh ratio $R_\theta$ calculated from scattering measurements can be defined as the scattered power per unit solid angle per unit sample length viewed at an angle θ to the input beam axis when the sample is illuminated by unit intensity unpolarized light, relative to the scattering in a reference sample. Corning HPFS 7980 high-purity silica was used as a reference. If the Rayleigh ratio and depolarization ratio are known, the total loss due to the scattering can be described as:

$$\alpha = 8\pi/3(2+\rho)R_{90}/(1+\rho) \qquad \text{Eq. 1}$$

where the depolarization ratio $\rho = I_H(90)/I_V(90)$ and $R_{90}$ is the Rayleigh ratio measured at 90° relative to the input beam axis.

Figure 5:
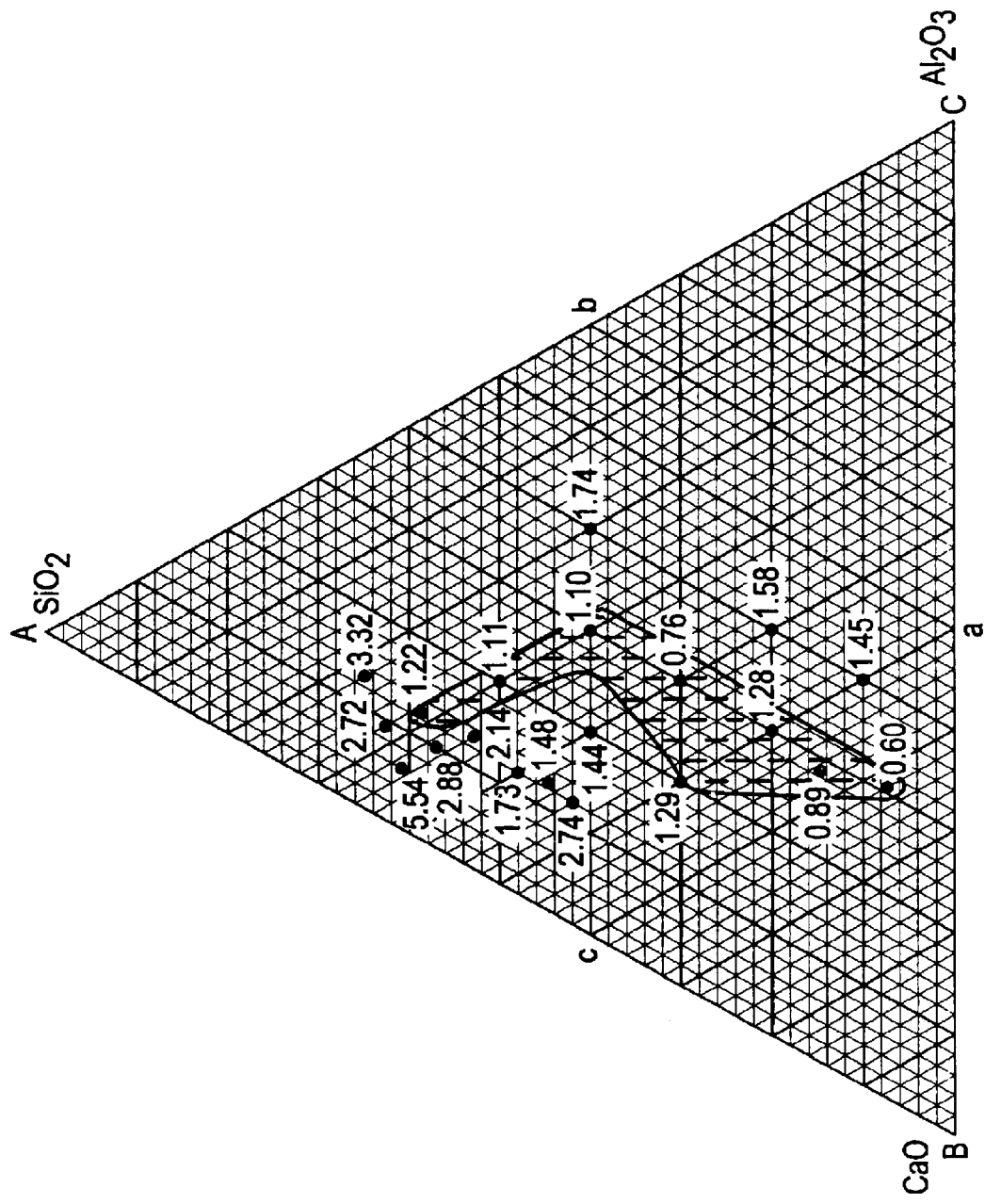
FIG. 5 is a ternary diagram of Ca—Al—Si glasses of the invention showing the Rayleigh ratio ($R_{90}$) with respect to pure silica glass and a shaded region defining glasses with low scattering.

The Rayleigh ratio $R_{90}$ for different ternary Ca—Al silicate glasses are shown in FIG. 5 and the most preferred glasses which exhibit lowest scattering in accordance with the invention are found to lie within the shaded area illustrated in FIG. 5. However, it is likely that suitable low scattering glasses are present, especially in the areas immediately adjacent the shaded region. The lowest value of $R_{90} \sim 0.60$ is observed in glass composition E, which also has the lowest $SiO_2$ content (see Table 1). The controlling factors for Rayleigh scattering in a glass are refractive index, fictive temperature $T_f$, compressibility at $T_f$ and photoelastic constant. The glass transition temperatures for all Ca—Al silicate glasses studied here range between 800 and 850° C. and therefore, any compositional variation in $T_1$ cannot affect the Rayleigh scattering in these glasses significantly. The refractive indices of these glasses decrease monotonically with decreasing $SiO_2$ (Mazurin et al., *Ternary Silicate Glasses*, Elsevier, N.Y. (1987), which is hereby incorporated by reference in its entirety). Such a variation by itself, in contrary to the observation, would predict a lowering of Rayleigh scattering with increasing $SiO_2$ content. Although any data on the bulk modulii of these glasses are not available in the literature, Young's modulii and shear modulii show less than ten percent variation over similar compositional ranges (Mazurin et al., *Ternary Silicate Glasses*, Elsevier, N.Y. (1987), which is hereby incorporated by reference in its entirety). As the three elastic modulii are inter-related, this result automatically implies small variation in bulk modulii or compressibilities in these glasses. Thus, for Ca—Al silicate glasses the compositional variation in photoelastic constants must play the most important role in controlling the Rayleigh scattering.

Example 2
Preparation of Optical Fibers Using Ca—Al—Si Glasses

Using glass compositions prepared as described in Example 1, glass fibers will be drawn on a draw tower to form a glass fiber having a diameter of about 125 µm. Glass fibers will be formed using either a double crucible method with a silicate cladding glass composition or by rod-in-tube method with a Ca—Al—Si glass having a higher silica content as the cladding glass. Draw speeds will be in excess of 20 m/s. After cooling, multi-functional acrylate coatings (both primary and secondary coatings) will be applied using conventional coating procedures and UV curing with a D bulb (available from Fusion UV Systems, Inc.), resulting in an optical fiber having a diameter of about 245±10 µm.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An optical component for a telecommunication system comprising a glass light conducting material comprising, in mole percent:

$SiO_2$ present in an amount of about 6 to about 60 percent, $Ga_2O_3$, $Al_2O_3$, or a combination thereof present in an amount of about 12 to about 31 percent, and CaO present in an amount of about 20 to about 65 percent, wherein the glass substantially excludes $Sb_2O_3$ and $B_2O_3$.

2. The optical component according to claim 1 wherein the glass is characterized by a Rayleigh ratio of about 0.50 to about 1.4.

3. The optical component according to claim 1 wherein the glass light conducting material has a composition comprising, in mole percent:

SiO$_2$ present in an amount of about 6 to 13.5 percent or 29 to about 60 percent, Ga$_2$O$_3$, Al$_2$O$_3$, or a combination thereof present in an amount of about 12 to about 31 percent, and CaO present in an amount of about 20 to about 65 percent.

4. The optical component according to claim 1 wherein the glass light conducting material has a composition comprising, in mole percent:

SiO$_2$ present in an amount of about 6 to about 60 percent,

Ga$_2$O$_3$, Al$_2$O$_3$, or a combination thereof present in an amount of about 12 to 13.5 percent or 27.5 to about 31 percent, and CaO present in an amount of about 20 to about 65 percent.

5. The optical component according to claim 1 wherein the glass light conducting material has a composition comprising, in mole percent:

SiO$_2$ present in an amount of about 6 to about 60 percent,

Ga$_2$O$_3$, Al$_2$O$_3$, or a combination thereof present in an amount of about 12 to about 31 percent, and CaO present in an amount of about 20 up to 49.5 percent.

6. A method of making the optical component of claim 1 comprising:

forming the light conducting material into a desired shape under conditions effective to form the optical component.

7. A method of transmitting an optic signal comprising:

passing an optic signal into one end of an optical component according to claim 1 under conditions effective to transmit the signal to an opposite end of the optical component, wherein the signal loss from the one end to the opposite end is less than about 0.20 dB/km.

8. The optical component according to claim 1 wherein the component is in the form of a planar waveguide.

9. A method of making the planar waveguide of claim 8 comprising:

depositing the glass light conducting material onto a substrate comprising a cladding layer, with the glass light conducting material positioned adjacent the cladding layer and covering the glass light conducting material with an overcladding layer, thereby forming the planar waveguide.

10. The optical component according to claim 1 wherein the component is in the form of an optical fiber.

11. The optical component according to claim 10 wherein the optical fiber is characterized by an attenuation of less than about 0.20 dB/km.

12. The method of making an optical fiber of claim 10 comprising:

forming the glass light conducting material into a fiber comprising a core and a cladding layer and encapsulating the fiber with one or more coatings, thereby forming the optical fiber.

13. The method according to claim 12 wherein said encapsulating comprises:

coating the fiber with one or more curable coating compositions and treating the coated fiber under conditions effective to cure the coating compositions, forming the one or more coatings.

14. A glass having a composition comprising, in mole percent:

(a) SiO$_2$ present in an amount of about 6 to 13.5 percent or 29 to about 60 percent, Ga$_2$O$_3$, Al$_2$O$_3$, or a combination thereof present in an amount of about 12 to about 31 percent, and CaO present in an amount of about 20 to about 65 percent; or (b) SiO$_2$ present in an amount of about 6 to about 60 percent, Ga$_2$O$_3$, Al$_2$O$_3$, or a combination thereof present in an amount of about 12 to 13.5 percent or 27.5 to about 31 percent, and CaO present in an amount of about 20 to about 65 percent; or (c) SiO$_2$ present in an amount of about 6 to about 60 percent, Ga$_2$O$_3$, Al$_2$O$_3$, or a combination thereof present in an amount of about 12 to about 31 percent, and CaO present in an amount of about 20 up to 49.5 percent;

wherein the glass excludes Ta$_2$O$_5$, TiO$_2$, ZrO$_2$, Sb$_2$O$_3$, and B$_2$O$_3$.

15. The glass according to claim 14 wherein CaO is present in an amount of about 20 up to 49.5 percent.

16. The glass according to claim 14 wherein SiO$_2$ is present in an amount of 29 to about 60 percent.

17. The glass according to claim 14 wherein SiO$_2$ is present in an amount of about 6 to 13.5 percent.

18. The glass according to claim 14 wherein Ga$_2$O$_3$, Al$_2$O$_3$, or a combination thereof are present in an amount of about 12 to 13.5 percent.

19. The glass according to claim 14 wherein Ga$_2$O$_3$, Al$_2$O$_3$, or a combination thereof are present in an amount of 27.5 to about 31 percent.

20. A method of making the glass of claim 14 comprising at least one of the steps of:

quenching the glass in air;

splat quenching the glass; and roller quenching the glass.

* * * * *